Figure 1:
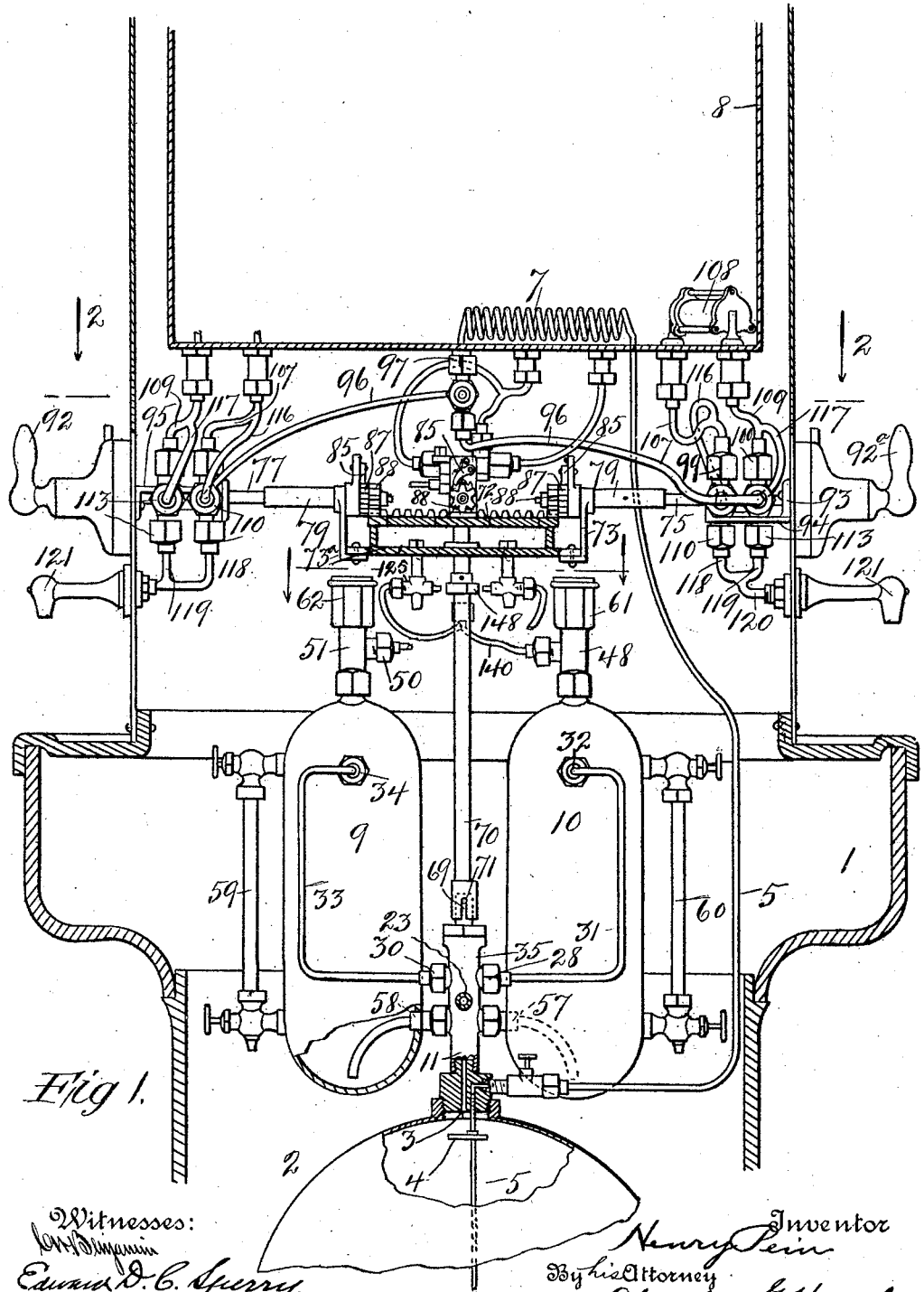

H. PEIN.
MACHINE FOR CARBONATING AND DISPENSING LIQUIDS.
APPLICATION FILED JAN. 8, 1912.

1,059,000.

Patented Apr. 15, 1913.

4 SHEETS—SHEET 1.

H. PEIN.
MACHINE FOR CARBONATING AND DISPENSING LIQUIDS.
APPLICATION FILED JAN. 8, 1912.

1,059,000.

Patented Apr. 15, 1913.

4 SHEETS—SHEET 2.

Witnesses:

Inventor
Henry Pein
By his Attorney
Charles G. Hursley

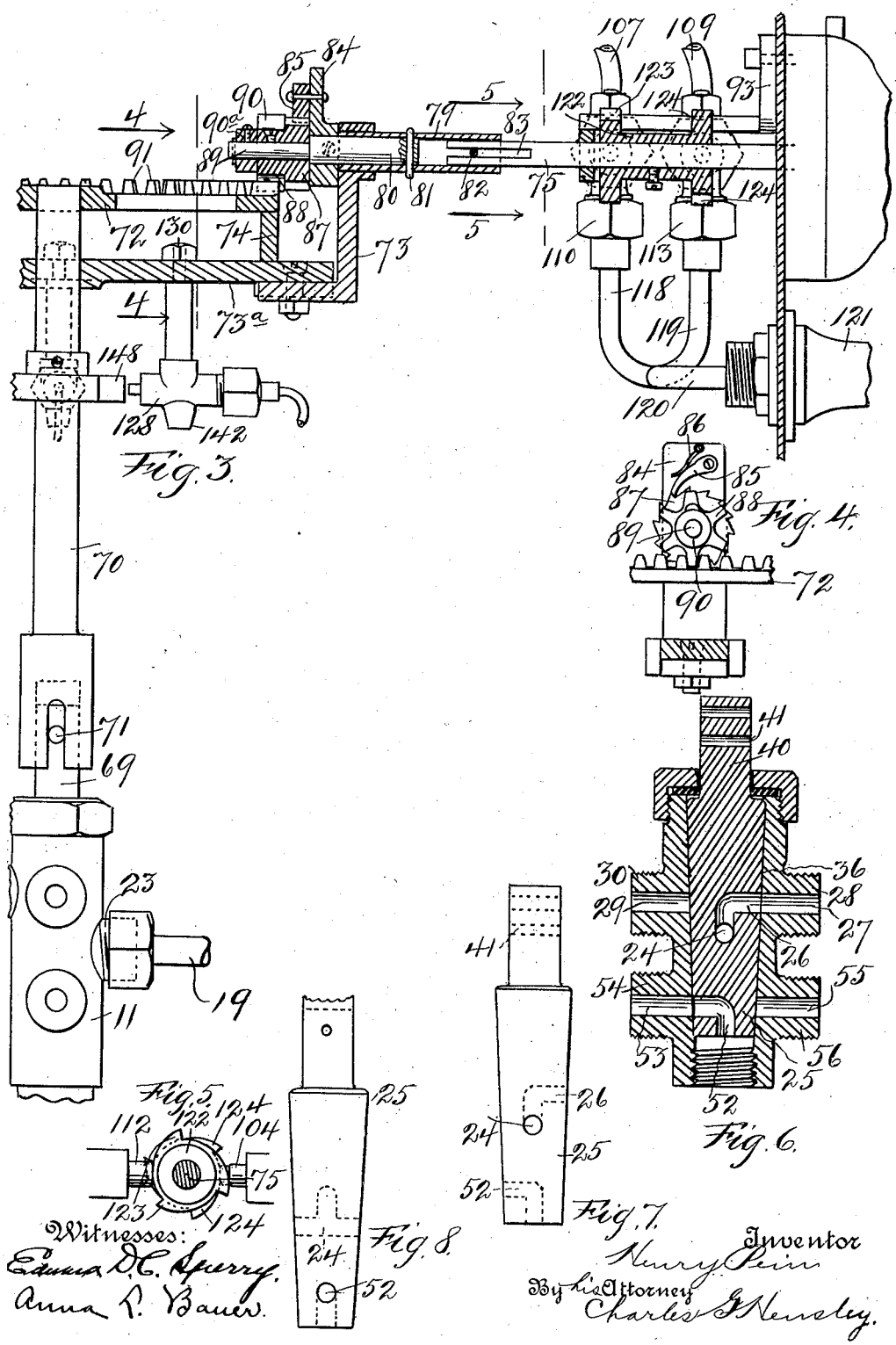

H. PEIN.
MACHINE FOR CARBONATING AND DISPENSING LIQUIDS.
APPLICATION FILED JAN. 8, 1912.
1,059,000.
Patented Apr. 15, 1913.
4 SHEETS—SHEET 4.
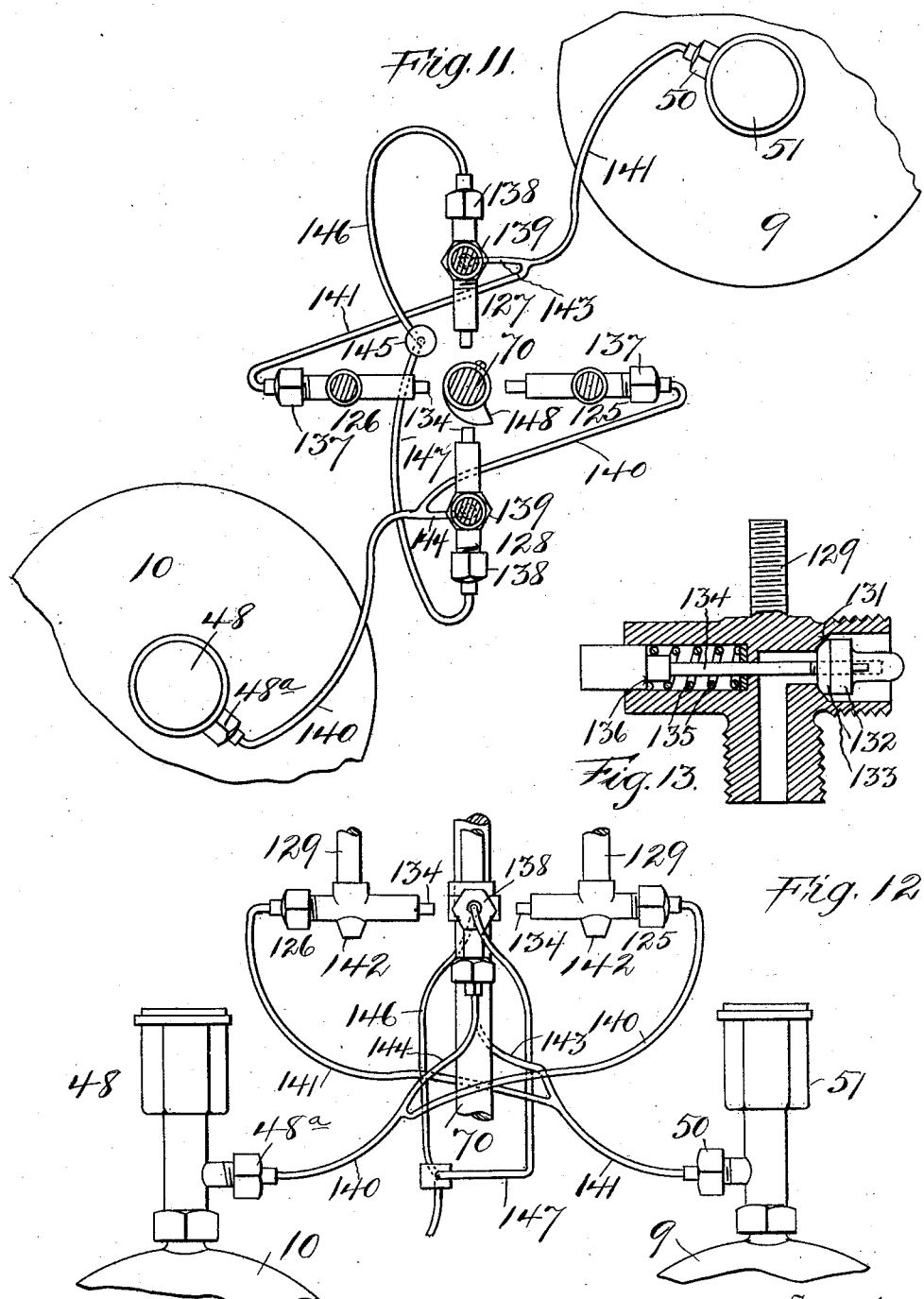

UNITED STATES PATENT OFFICE.

HENRY PEIN, OF JERSEY CITY, NEW JERSEY, ASSIGNOR TO SANITARY FOUNTAIN CO., OF JERSEY CITY, NEW JERSEY, A CORPORATION OF NEW JERSEY.

MACHINE FOR CARBONATING AND DISPENSING LIQUIDS.

1,059,000.  Specification of Letters Patent.  Patented Apr. 15, 1913.

Application filed January 8, 1912. Serial No. 669,954.

*To all whom it may concern:*

Be it known that I, HENRY PEIN, a citizen of the United States, and a resident of Jersey City, in the county of Hudson, State of New Jersey, have invented a certain new and useful Machine for Carbonating and Dispensing Liquids, of which the following is a specification.

My invention relates to a machine for carbonating liquid automatically and for dispensing the liquid, and though my invention in its entirety accomplishes a very important result, due to the various branches of the whole acting in correlation, nevertheless some parts of my invention may be used independently in other relationships.

I will describe my invention in its full combination and embodiment, as constructed for both carbonating a liquid and automatically dispensing the same.

Under the present invention it is possible to make a machine which will automatically carbonate a liquid, such as water, by properly commingling carbonic gas with the water, to form an aerated beverage; and which will automatically dispense the liquid in desired and predetermined equal quantities, preserving the liquid in the aerated condition until dispensed. The machine is adapted to be controlled by means of a coin controlled mechanism, and in my copending application serially numbered 669,953 and filed concurrently herewith, I have shown a coin mechanism which may be very successfully used in connection with the present machine, and which is made the subject matter of a separate application in order to comply with the rules of practice of the U. S. Patent Office. In the present case I have shown the coin mechanism of my said copending case applied to operate the present machine but it is to be understood that other than coin mechanism may be employed.

The object of my present invention is to overcome the objections of former constructions by providing means which will be mechanically operated for supplying liquid to the reservoir, as distinguished from means operated or controlled by the condition or weight of the liquid itself. In the fullest embodiment of my invention the supply of liquid to the reservoir is caused mechanically by the operation of the dispensing mechanism by which the operation of the machine is mechanically initiated. In this manner the supply to the reservoir is made positive and it will be operative as long as the machine is operative.

If the machine is connected with a continuous source of supply, liquid will be supplied to the machine as long as it is used to dispense drinks, and a point is not reached where the supplying means requires resetting. By connecting the supplying mechanism to be operated periodically and mechanically by the mechanism which controls the operation of the machine, the supply to the reservoir can be regulated to correspond with the rate of depletion in the reservoir as the liquid is dispensed therefrom. In other words, there will be a relationship between the amount furnished to the reservoir and that dispensed by the machine, and mechanically and properly regulated.

Another object of my invention is to accomplish the above objects in a machine in which a charged liquid is used and more especially in a machine in which the liquid is therein charged with a gas so that an automatic vending machine for such liquids may be had. In the preferred form of my invention I introduce the liquid and the gas in a primary receptacle and from this they are passed into the reservoir, from whence the aerated liquid is dispensed. The entry of the liquid and gas into the primary receptacle is preferably controlled mechanically from the mechanism which controls the operation of the machine. I also am able to use the force of the incoming gas to project the liquid from the primary receptacle into the reservoir. I am also able to let off the residuum of gas and air in the primary receptacle after it has been discharged of its liquid so that a new supply of water may be received therein and a fresh supply of gas as well, and this without depreciating the mixture in the reservoir.

Another object of my invention is to provide a machine which will not drip, and wherein air will not enter into any part occupied by the gas or carbonated liquid, even though the machine stands unused for comparatively long periods.

Another object of my invention is to construct a machine having the above advantages and in which the liquid may be independently and simultaneously, or individually discharged at different points, such as from several faucets on the same machine, taking the liquid from the common reservoir.

Another object is to construct the dispensing devices so that in dispensing from several faucets, the mechanism will be reduced to simple construction.

Another object of my invention is to operate a common reservoir filling device in connection with the several dispensing devices.

With these and other objects in view, I have embodied my invention in a concrete structure which embodies what I consider to be the form of my invention.

Figure 2:
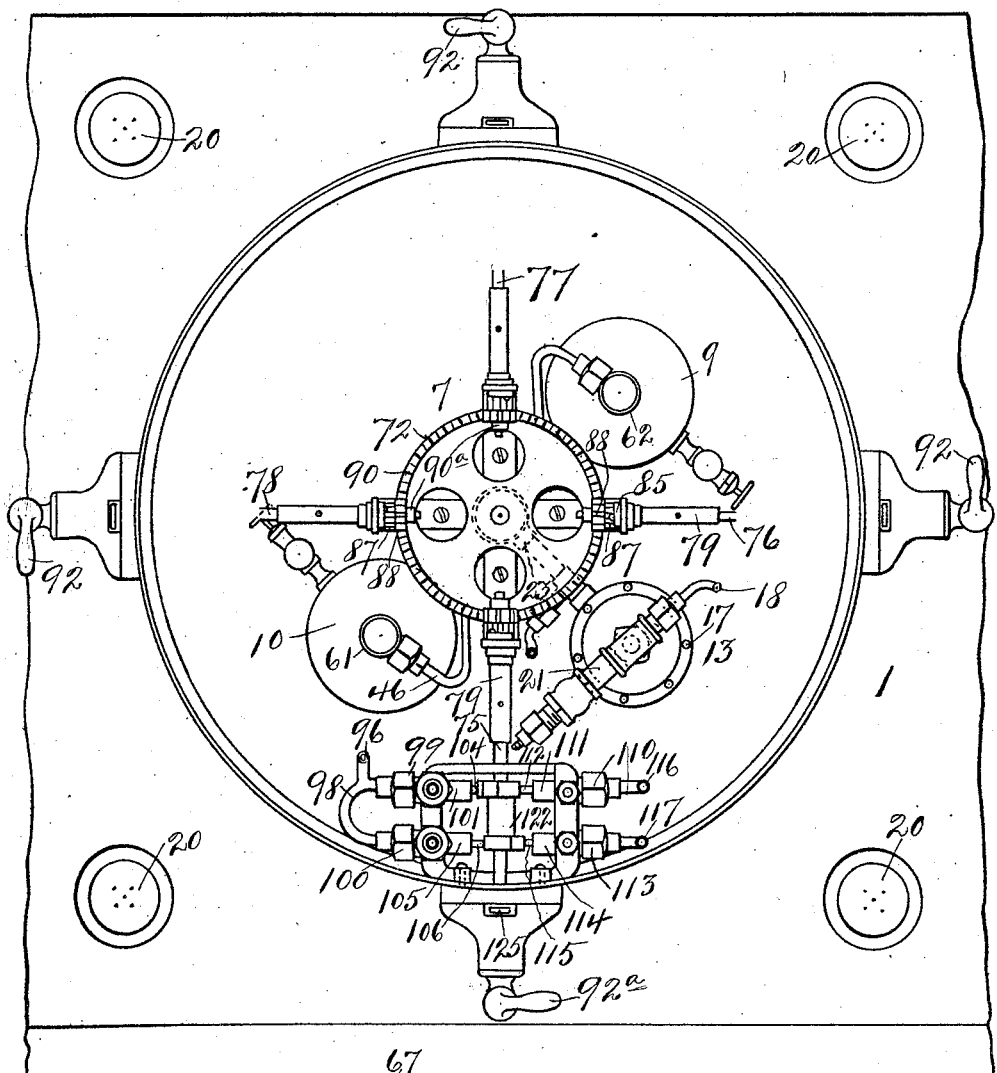
Figure 9:
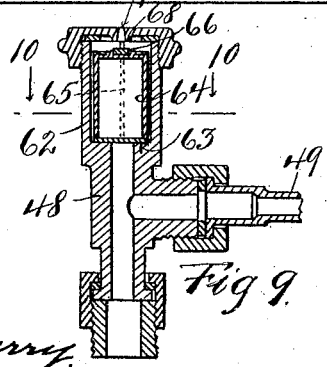
Figure 10:
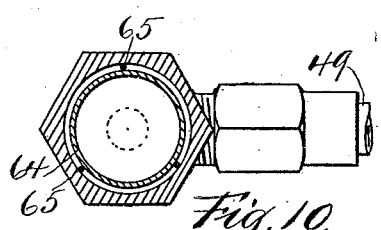

In the drawings forming a part of this application, Figure 1, is an elevation of a machine embodying my invention, in which certain parts are shown in section, Fig. 2, is a plan view in which certain duplicate parts are omitted; and is taken on the line 2—2 of Fig. 1, Fig. 3, is a sectional view showing parts of the mechanism for operating the refilling device, Fig. 4, is a cross section taken on the line 4—4 of Fig. 3, looking in the direction of the arrows, Fig. 5, is a sectional view, taken on the line 5—5 of Fig. 3, looking in the direction of the arrows, Fig. 6, is a sectional view of the valve which controls the supply of liquid to the primary receptacles and the reservoir, Fig. 7, is an elevation of the valve removed from its casing, Fig. 8, is a similar view from a different point, Fig. 9, is a sectional view showing the valve by which the primary liquid receptacles are relieved of their pressure, Fig. 10, is a section thereof, taken on the line 10—10 of Fig. 9, looking in the direction of the arrows, Fig. 11, is a plan view of the parts controlling the supply of gas to the primary receptacles and the discharge of residual gas preceding the refilling of the primary receptacle with water, Fig. 12, is an elevation of the same, and Fig. 13, is a sectional view of one of the valves.

In adapting my invention to a machine in which several faucets dispense liquid from a common reservoir I prefer to provide two primary liquid receptacles for supplying the liquid to the reservoir and to operate them so that while one is being filled the other can be emptying its contents into the reservoir. I will describe my invention as embodied in such a structure, although it will be obvious that a single primary receptacle may be used.

In the drawings I have shown my apparatus placed in and on a cabinet 1, whereby the apparatus may be used as a public liquid dispensing machine, but such arrangement is only preferred and may be departed from without changing the nature of the apparatus.

I have shown a reservoir 2, which consists merely of a metal tank suitable for containing a liquid and a gas under pressure, which tank is not of itself, necessarily of special construction. The liquid is preferably admitted to the top of the tank and withdrawn from the bottom. I admit the liquid at the port 3, and it strikes against the plate 4, which causes it to spray; and in thus breaking the stream into a spray within the part of the reservoir usually occupied by the gas, a more complete commingling of the gas and water is accomplished. The water is taken from the reservoir through the pipe 5, which runs down to near the bottom of the reservoir and through this pipe 5, the aerated liquid is taken to a cooling coil 7, arranged in an ice chamber 8, at the top of the cabinet.

I have arranged two primary receptacles 9 and 10, which alternately discharge a regular quantity of water into the reservoir. In a casing 11, I have arranged a valve, 25, which is automatically operated when the vending apparatus is operated, and it controls the supply of liquid. The valve casing 11, is provided with various connections and ports, with which latter, ports in the valve are adapted to register. I have provided a filter 13, consisting of two spherical halves 14 and 15, which are clamped tightly together by bolts 17, with a piece of felt 16, between them. The water or other liquid is received through a pipe 19, from the continuous source of supply, usually from a water main. In passing through the sheet of felt, the water is filtered and cleansed, leaving a residue which can be removed by taking off the upper half of the filter.

The pipe 19, is coupled with a connection 23, on the valve body 11, whereby the liquid is brought into the valve body through a port 24, in the valve. The valve 25, has a number of ports extending in various directions and one of these ports 24, extends through the valve, preferably transversely, and connects with an L shape outlet port 26. At each half revolution of the valve, one end of the port 24, is brought into register with the inlet pipe 19, or rather the bore thereof, and the extension 26, of this port is at the same time brought into register with either the port 27, of a connection 28, or the port 29, of a connection 30, arranged opposite each other on the valve body. A pipe 31, is coupled with the connection 28, and connects at the point 32, with the upper part of the primary receptacle 10. Similarly a pipe 33, is coupled with the connection 30, and at 34, it connects with the upper part of the primary receptacle 9. From this it will be apparent that at every half turn of the valve, the port 24, 26, will connect the water supply, first with the receptacle 10, and then with the receptacle 9, thereby alternately supplying each with water, or other liquid, to be carbonated and dispensed.

The valve 25, is also provided with an angular port 52, one end of which travels on the horizontal line of a port 53, in connection 54, and a port 55, in the connection 56, and the other end extends to the bottom of the valve and opens into the pipe 3, and therefore discharges into the reservoir. To the connection 56, is coupled a pipe 57, which is coupled to the receptacle 10 and runs to the bottom thereof, so that the receptacle will be completely drained. Likewise a pipe 58, is coupled to the connection 54, and it is connected with the receptacle 9, and extends to the bottom thereof, so as to completely drain the latter. At every half turn of the valve, the port 52, connects first the port 55, with the reservoir, thereby allowing the receptacle 10, to empty into the reservoir and then it connects the port 53, with the reservoir and therefore allows the receptacle 9, to empty into the reservoir.

The ports 26, and 52, are oppositely arranged, so that when one primary receptacle is receiving water the other is discharging its liquid.

The receptacles 9 and 10 may be provided with gages 59, and 60, respectively, if desired, to show the depth of liquid in the receptacles though such are not a necessity.

In the heads 48, and 51, on the tops of the primary receptacles I provide valves to permit the discharge of the air or gas in the primary receptacles, just before and during the time the liquid is running into them, to permit the receptacles to be filled with liquid; and these valves are adapted to be closed by the liquid when it reaches a predetermined height, preferably when the receptacles are entirely filled. Both such valves are alike so that a description of one will answer for both. The casings of these valves are numbered 61 and 62, in Fig. 1, and the details thereof, are shown in Figs. 9 and 10. The casing 62, is hollow and is formed with a shoulder 63, on which a float 64, may rest and at the top it is provided with an open vent 67, surrounded by a valve seat 68. The float 64, is provided with rods 65, on its exterior, which space the float from the interior wall of the casing, 62, to allow the exhaust from the receptacle 9, or 10 as the case may be, to pass around the float and through the vent 67. A valve 66, is carried on the top of the float, which seats on the valve seat 68, and shuts off the vent. The float may rest on the shoulder 63, while the receptacle to which the valve is connected is being filled with liquid and when the liquid reaches the float it lifts the latter and seats the valve 66, and prevents the liquid in the receptacle from overflowing, by closing the vent 67.

In Figs. 11 and 12, I have shown the devices for supplying the gas automatically, at definite periods, to the primary receptacles; and for relieving any residual pressure just previous to the admission of the liquid. I have made this branch of the apparatus automatic, that is, controlled by the manually operated branch of the device so that the gas will be controlled according to the aerated liquid dispensed. I have arranged this branch of the machine, so that the operations will be properly timed relative to the periodical charging of the primary receptacles with liquid. I prefer therefore to control the gas supply and liquid supply through the same operating mechanism.

I have found that where ground in valves are used to control the supply of gas to the reservoir it is impossible to obtain a sufficiently tight metal to metal contact between the valve and its seat, or casing, to prevent gas from passing when the valve is closed, unless the valve is arranged so tight in its casing as to make it practically impossible to operate. The result, where ground in valves have been used, has been a continual leakage of gas, resulting in a leakage at the dispensing faucets, which aside from the loss of gas causes a breaking down of the aerated liquid. In addition to this there was the additional disadvantage that gas passing the valve backed into the water main from which the liquid supply of the machine was obtained, causing many difficulties. It is feasible to use the ground in valve for the water supply, but not for the gas supply; and I therefore prefer to use separate valve systems for the water and gas. For the gas I use valves wherein packing is used, wherein the gas pressure is always acting in such a direction that it tends to seat the valves and I am thereby able to completely control the gas and prevent leakage.

To the under side of the spider 73ª I secure valve casings 125, and 126, in opposite positions and preferably at right angles to said valve casings I secure other valve casings 127 and 128, also arranged in opposite positions. The first two valves are alike and the last two are alike but differ from the first only in the number of connections. Each valve body has a threaded bar 129, by means of which, and nuts 130, the valve bodies are secured to the spider 73ª. Each valve body has a valve seat 131; a valve 132, provided with a packing 133, adapted to contact with the valve seat; a spindle 134, for the valve, extending outwardly through one end of the valve body; and a spring 135, tending always to close the valve by reason of its pressure against the shoulder 136. The valves 125, and 126, have only a connection at the coupling 137, while the valves 127, and 128, have connections at couplings 138, and 139, and this is the only necessary difference between valves 125, 126, and 127, 128, so that a detailed description of each one is unnecessary.

The valve body 125, is connected with the primary reservoir 10, by means of a pipe 140, which is joined at one end to the coupling 48$^a$ on the head 48, and to the coupling 137, on valve body 125. Likewise the valve body 126, is connected with primary reservoir 9, by means of a pipe 141, one end of which is joined to the coupling 50, on the head 51, and the other to the coupling 137, on valve body 126. The purpose of valves 125, and 126, is to reduce the primary receptacles 10, and 9, to atmospheric pressure by allowing the gas pressure therein to blow off or sniff, just before water is admitted thereto, preferably by allowing the pressure to escape through the plugs 142. The valve body 127, also connects with the primary receptacle 9, by means of a pipe 143, connected to the coupling 139, and preferably by joining with the pipe 141 to reduce the number of connections. Likewise the valve body 128, is connected to the primary receptacle 10, by means of a pipe 144, which connects at one end with coupling 139, on valve body 128, and preferably joins the pipe 140. It will be observed from this that valves 126, and 127, are both connected with receptacle 9, and valves 125, and 128, are both connected with receptacle 10. In addition to the above, valves 127, and 128 are connected to a gas supply. I have represented at 145, the gas supply, which may be any gas receptacle, preferably one of the long tubes generally used for soda fountains. A pipe 146, connects with the gas supply 145, and also with the coupling 138, on the valve body 127; while a pipe 147, connects with the gas supply and with the coupling 138 on the valve body 128.

I have arranged the several valves in a circle around the shaft 70, with their stems 134, all directed toward the latter; and with valves 125, and 126, alternating in position with valves 127, and 128.

On the shaft 70, I have arranged a cam 148, which travels with the shaft, in such a path that it will successively engage and move the spindles on valve bodies 125 to 128, for the purpose of unseating the valves. With the cam 148, starting from the position shown in Fig. 11, and making one revolution in a clockwise direction the cam will first press the stem 134, of valve body 128, thus unseating the valve 132, therein. This will open the gas supply 145, with receptacle 10, holding it open long enough to allow a supply of gas to enter. As soon as the cam moves away from the spindle this valve will close by reason of its spring and the pressure of gas behind the valve. After making about a quarter revolution the cam will press in the spindle 134, of valve body 126, unseating the valve therein. This will release any gas in receptacle 9, and reduce the latter to atmospheric pressure, preparatory to the reception of the liquid. Another quarter turn of shaft 70, will bring cam 148, into contact with the spindle of valve body 127, and this will connect the gas supply 145, with receptacle 9. Another quarter turn and the cam will contact with the spindle of valve body 125, and unseat the valve therein. This will open the receptacle 10, through plug 142, in valve body 125, release gas in receptacle 10 and reduce the same to atmospheric pressure preparatory to the reception of the liquid. Liquid is admitted to receptacle 10, and discharged from receptacle 9, at about the time cam 148, is in the position shown in Fig. 11, while receptacle 10, will be emptied of liquid and receptacle 9, filled with liquid while cam 148, contacts with spindle of valve body 126, and before it acts on the spindle of valve body 127.

As the greatest gas pressure is at the source of gas supply 145, it will be observed from the above description that the greatest pressure is always behind the valves, always tending to seat the valves 127, 128, except when positively opened by the cam. It should also be noted the pressure from receptacles 10, and 9, is behind the valves 125, and 126, and as this is generally above atmospheric pressure the tendency is to seat the valves in valve bodies 125, and 126. Therefore the greatest pressure in each instance acts to seat the valves and thereby I prevent the escape of gas at all times except when such is intended. This is materially aided by providing a separate system of valves for the liquid and gas.

We now come to the device for operating the liquid and gas valves. An upright shaft 70, is sleeved over the spindle 69, of the valve 25, and a pin 71, causes the valve to revolve with the shaft 70. The latter at the top is provided with means by which the several operating devices of the machine will impart a partial rotation to the shaft 70, each time they are operated, and I preferably employ a horizontal gear 72, on the top of the shaft 70, on which the several operating devices act. The gear 72, is shown as resting on a flange 74, which latter surrounds the shaft 70, and is secured to a spider 73$^a$, supported on the brackets 73, which steady the structure. I have arranged four sets of operating mechanisms, disposed radially around the gear 72, equidistant from each other, though this number and arrangement may be varied.

I have provided four horizontal shafts 75, 76, 77, and 78, directed toward the gear 72, and for simplicity I have shown the details of the shaft 75, and its connections, and omitted the parts by which the shafts 76, 77, and 78, are operated; and it is to be understood that the mechanisms connected with these latter shafts are duplicates of that connected with shaft 75. The latter shaft is slotted at 83, and extends into a sleeve 79, which is secured by a pin 81, on another shaft 80, in line with the shaft 75; and the latter revolves the shaft 80, by reason of a pin 82, through said slot and the sleeve 79. This forms a slip joint between the parts and the shaft 80, responds to the rotations of the shaft 75. To the shaft 80, is secured a hub carrying an arm 84, which revolves with the shaft and this arm is provided with a pawl 85, pressed by a spring 86, (see Fig. 4) into the teeth of a ratchet wheel 87, which is loose on a reduced portion 89, of the shaft 80.

Preferably formed integral with the ratchet 87, and moving therewith, is a pinion 90, which meshes with the teeth 91, of the gear 72, and the latter will therefore be responsive to the movements of the ratchet and pinion. The latter are held loosely on shaft 80 by a collar 90$^a$ secured to the shaft. From the above, it will be apparent that when the shaft 75, revolves the shaft 80, and the arm 84, will revolve. The pawl 85, engaging in the teeth of the ratchet wheel 87, will cause the pinion to move with the shaft 80, and thus the gear 72, will be revolved. But each of the shafts 76, 77, and 78, are provided with similar ratchets, pawls, arms and pinions, and the latter all mesh with the gear 72, and they are all adapted to revolve the gear. If one of the pinions is moving the gear 72, however, the various shafts with which the remaining pinions are connected will not be revolved by reason of the movement of the gear 72. If, for instance, the shaft 76, is being revolved its pinion will revolve the gear 72, and the pinion 88, on shaft 80—75 will revolve therewith, but the pawl 85, of this shaft, will ride over the ratchet teeth in this movement and the shaft 80, will therefore be left idle. So that it will be apparent that the gear 72, may be revolved by either the shaft 75, 76, 77, or 78, without disturbing any of the remaining ones. It will also be apparent that one or more of these shafts may simultaneously operate the gear 72, without disturbing the remaining ones. These shafts 75, 76, 77, preferably operate the valves which control the dispensing of the liquid and are themselves manually operated, through the coin controlled mechanism. The shafts 75, etc., correspond with the shaft of my said copending application and are preferably revolved a partial revolution through the mechanism shown in my said copending case, each time the operating handles 92, are operated from the exterior of the cabinet, whenever a purchaser draws a glass of the liquid.

On the interior of the casing I have arranged four sets of controlling devices for dispensing the liquid, but since they are all alike, I will describe one set, from which the whole device will be readily understood. Inside the cabinet 1, I have arranged a bracket 93, one plate 94, of which is on a slightly lower plane than the plate 95, and these plates support various couplings and valves.

There is a pipe 96, running from a common coupling 97, which connects with the cooling coil 7, to each of the vending devices.

At 98, the pipe 96, is bifurcated, one end going to a coupling 99, on the bracket; and the other going to a coupling 100 also mounted on the bracket. The coupling 99, is provided with a valve casing 101, in which there is a valve similar to the valve shown in Fig. 13, and it is arranged to be seated by a coil spring in the same manner, and the pressure behind this valve tends to seat it, whereby the pressure prevents leakage when the machine is idle. The spindle 104, of this valve is directed toward the shaft 75. The coupling 100, is also provided with a valve casing 105, in which there is a valve in all respects similar to the one just described, and its spindle 106, also projects toward the shaft 75. The coupling 99, is connected by a pipe 107, to one end of a measuring cup 108, which is adapted to measure a definite quantity of liquid and which is of the piston type. In my application for Letters Patent filed on the 12th day of July 1910, and serially numbered, 571557, I showed and described a very efficient measuring cup which may be clearly understood by reference to said application. The purpose of the pipe 107, is to convey the liquid to the measuring cup whether it be of the type shown in my said application or any other type, and to return the liquid after it has been measured, to another coupling, as will appear. The coupling 100, is connected by a pipe 109, with the opposite end of the measuring cup 108, whereby liquid is carried to be measured and is afterward returned to a different coupling for distribution. The liquids from pipes 107, 109, are measured and distributed separately. Opposite the couplings 99, and 100, on the same bracket I have arranged other couplings and valves. The coupling 110, is provided with a valve casing 11, in which there is a valve in all respects similar to valve 102, and its spindle 112, is also directed toward the shaft 75. The coupling 113, secured to the bracket, is provided with a valve casing 114, having a similar valve and the spindle 115, of this valve projects toward the shaft 75. The coupling 110, is connected with the pipe 107, by a pipe 116, and therefore in connection with one side of the measuring cup; while the coupling 113, is connected to the pipe 109, by a pipe 117, and therefore with the other side of the measuring cup. The couplings 110, and 113, are connected by pipes 118, and 119, respectively, which unite in a common pipe 120, with a discharge spout 121, from which the liquid is delivered to a drinking glass placed thereunder. The spindles 104, and 112, are preferably on opposite sides of the shaft 75, and the spindles 106, and 115 are preferably arranged on opposite sides of the shaft.

The shaft 75, is provided with a sleeve 122, which is secured thereto, and the sleeve has various cams for operating the several valve spindles in definite order. I have arranged the shaft 75, to progress in the same direction at each operation, which is preferable, and I prefer to arrange the cams to act accordingly. On one end of the sleeve 122, I have arranged three cams 123, spaced equidistant from each other around the sleeve, which are adapted to press the spindles 104, and 122, in for the purpose of unseating their valves, but at different times, that is, they are pressed inwardly in alternate relation with regard to each other. On the other end of the sleeve 122, I have arranged a second set of cams 124, preferably three in number, spaced equidistant around the sleeve; and these cams act upon the spindles 106, 115, for the purpose of pressing them to unseat their respective valves, the return of such valves being caused in the four instances by the several valve springs and by the pressure behind the valves. The cams 124, operate on the spindles 106, and 115, alternately similar to cams 123, on their spindles. The arrangement however, of the cams 123, and 124, is alternate each to the other, so that the valve spindles 104, and 106, will be forced inwardly by their cams in alternate relation to each other; and the spindles 112, and 115, will be forced inwardly in alternate relation as to each other.

Operation: Let it be assumed that the various parts are in the position shown in the drawings and that a coin is deposited in the slot 125, and the handle 92$^a$, shown in the lower part of Fig. 2, is turned to the right as far as it will go. This will turn the shaft 75, and sleeve 122, a partial revolution. One of the cams 123, will be moved away from the valve stem 104, causing this valve to close, and the connection between the cooling coil 7, and the one side of the measuring cup through which the pipe 107, connects. At the same time, one of the cams 123, forces the spindle 112, inwardly and opens the valve in casing 111; thereby opening the pipe 116, which connects with the side of the measuring cup which has just been shut off from the liquid supply, to the spout 121, under slot 125; when the liquid in the measuring cup connected with this set of mechanisms will discharge its contents into a tumbler placed under it. At the same time, one of the cams 124, forced the spindle 106, inwardly unseated the valve in casing 105, and connected the cooling coil 7, up with the opposite side of the measuring cup 108, through the pipe 109. The liquid entering the right side of the cup in Fig. 1, forces over a piston (as will be understood in my pending application Serial No. 571,557 filed July 12th, 1910) and forces the liquid on the opposite side of the piston out through pipe 116, which is connected with the discharge spout. At the same time the measuring cup is filled with liquid from pipe 109, and remains so until the next succeeding operation of the handle 92$^a$. Another of the cams 124, moves away from the spindle 115, thereby releasing the valve in casing 114, and allowing it to be seated by its spring and the pressure, in which condition it will remain until the next operation of this particular mechanism. The closing of valve 114, closes the discharge pipe 117, running from pipe 109, and therefore closes the discharge connection from that side of the measuring cup to which the supply has just been connected. In this manner the cooling coil which supplies the aerated liquid to the measuring cup is disconnected from one side of the cup and connected with the other: and the discharge spout is disconnected from that side of the measuring cup to which the supply is connected and is connected with that side of the cup from which the supply is disconnected; and this operation is accomplished without the use of ground-in valves, but instead, with valves in which the pressure tends to seat the valves at all times: so that there will be no leakage from the valves when closed, either of liquid or gas, and no deterioration of the mixture, at this point. When the handle 92$^a$ is operated again, the cams 123, 124, will reverse the condition of the valves 101, 105, 111, and 114, and the liquid will be withdrawn from the reverse side of the measuring cup and will be supplied to that side from which the liquid was withdrawn in the previously described operation. The liquid is thus supplied to and withdrawn from, opposite sides of the measuring cup alternately. If the machine remains idle for any considerable time there will be no leakage or deterioration. These operations may be repeated as often as desired and liquid will be dispensed at each operation.

Since there are valves, a measuring cup, supply, and discharge, for every operating or coin mechanism, all may be operated simultaneously, or in any order, as each dispensing mechanism operates independently.

The movement of the shaft 75, in the above operation may be followed through the other mechanisms. The partial rotation of shaft 75, was transmitted through the connected shaft 80, to the pawl arm 84. The movement of the latter caused, by means of the pawl 85, the ratchet wheel 87, to partially revolve: and since the pinion 88, is part thereof, the movement is transmitted through the pinion to the large gear 72. The latter was in this manner caused to revolve a slight amount; and consequently its shaft 70, and the valve 25. This movement of the gear 72, may be repeated by the successive operations of the handle 92ᵃ, or by any of the other handles operating in any order whatsoever. If two of the operating handles are operated at the same time and speed they will both revolve the gear 72, at the same time and no conflict will arise. If one operating handle is so turned while a second is being operated, so that it turns its shaft at a greater speed than the second one, then the faster one will revolve the gear 72. The pinion and ratchet wheel connected with the slower moving shaft will cause such pinion to escape under the pawl of such shaft, so that the slower moving shaft will not be turned from the gear 72. Otherwise the coin mechanism of the slower moving shaft might become disarranged in position, and the burdens of both operations might fall upon the fast moving shaft, which results I prefer to avoid. The operations of the various dispensing mechanisms acting on the gear 72, will finally cause a revolution of the shaft 70, and in fact they will cause successive revolutions thereof. Let it be assumed that the movement of the gear 72, be clockwise as viewed from the top as in Fig. 2; while the valve 25, is in the position shown in Fig. 6, the primary receptacle 10, is connected with the source of liquid supply, through pipe 19, connection 23, ports 24, and 26, in the valve 25, the port 27, in the connection 28, and through the pipe 31. During this position the primary receptacle 10, is disconnected from the reservoir, and it is therefore receiving its supply of liquid. When the liquid is coming into receptacle 10, through pipe 31, the relief valve 66, is unseated allowing the air or gas in receptacle 10, to be discharged to admit the incoming liquid; but when the liquid reaches the float 64, it will raise the latter, seat the valve 66, and stop the ingress and prevent the liquid from escaping. While this condition exists in the receptacle 10, a different condition exists in receptacle 9. The latter at this time is connected at the bottom with the reservoir through the pipe 58, the port 53, in coupling 54, through the port 52, in the valve 25, and the port 3, and the liquid from this receptacle is discharging or has discharged against the plate 4, causing it to break up into sprays and more readily mix with the gas. It may be restated, that while the replenishing operations are taking place in the gas and liquid devices the aerated liquid is being withdrawn from the bottom of the reservoir through pipe 5, into the cooling coil 7, and to the several dispensing faucets, and it is forced therethrough by the pressure of gas in the reservoir.

As above stated while the parts are in the position shown in the drawings the receptacle 10, is connected with the source of liquid supply but disconnected from the reservoir; and the receptacle 9, is disconnected from the liquid supply but it is connected with the reservoir. If the shaft 70, is revolved a slight extent the port 26, in the liquid valve 25, will gradually move away from the port 27, until the receptacle 10, is finally disconnected from the liquid supply, the receptacle by this time having been filled with liquid to such an extent that its float 64, is raised by the liquid until the valve 66, is seated. Just preceding the opening of port 55, the cam 148, on the shaft 70, begins to act upon the spindle of valve casing 128, to unseat the valve therein. As soon as cam 148, progresses far enough to unseat this valve the receptacle 10, will become connected with the source of gas supply through pipes 147, 144, and 140. The gas will enter through connection 48ᵃ into the head 48, and this will supply the receptacle 10, with enough gas to carbonate the amount of water in this receptacle; and it will also furnish the necessary pressure to force the liquid therefrom into the reservoir as the receptacle is connected therewith. When the cam 148, disengages from the spindle of valve casing 128, the valve therein will close under the action of its spring and the greater gas pressure behind it.

When the liquid port 27, leading to receptacle 10, was closed, the port 52, in valve 25, was also moved away from port 53, and thereby the receptacle 9, was disconnected from the reservoir. While the receptacle 9, is thus disconnected from both the liquid supply and the reservoir the dispensing mechanisms continue to revolve the shaft 70, until the cam 148, finally acts upon the spindle in valve casing 126, and finally unseats the valve therein. This will open the pipe 141, running from receptacle 9, and any residual pressure in the latter will be vented or sniffed through the open plug 142, on valve casing 126; reducing receptacle 9, to atmospheric pressure. This is for the purpose of permitting the subsequent ingress of liquid into this receptacle and also to release such gas as has not been mixed with the liquid or which did not follow the latter into the reservoir; and also to exhaust any air which the gas separated or displaced from the liquid while in the receptacle 9. When the pressure in receptacle 9, is thus released, following the exit of the liquid therefrom there will be nothing to hold up the float 64, in the head 51, and therefore the latter will drop by gravity, unseating the valve 66, which will remain unseated until the subsequent entry of a new supply of liquid. Further movement of the shaft 70, completing a half turn from the described starting position, will bring about another change of conditions. When this point is reached the port 26, in valve 25, will come to register with the port 29, and receptacle 9, will be opened with the liquid supply through pipes 23, and 33, and as the vent valve 66, is unseated and the receptacle 9, is at atmospheric pressure liquid will flow thereinto. Receptacle 9, will become filled with liquid until the latter raises the float 64, and seats valve 66, when further ingress will cease. At this time it is to be remembered that receptacle 9, is disconnected from the reservoir. At the same time that the above change occurred, the port 52, came to register with port 55, and thereby receptacle 10, was opened with the reservoir, through pipe 57, and port 3. The liquid in this receptacle thereupon emptied into the reservoir, striking the plate 4, which causes it to spray. The gas previously admitted to this receptacle forces the liquid, now partially carbonated, into the reservoir, and at least a portion of the free gas will follow the liquid into the reservoir to furnish the latter with a sufficient supply of gas to continue the aeration. When the liquid in receptacle 10, recedes, it no longer supports the float 64, in the top 48, but the gas pressure will be sufficient to support the float until the water is discharged from receptacle 10, into the reservoir. Otherwise the gas would escape not only from the receptacle 10, but also the reservoir at this moment. The reservoir 10, at this time it will be remembered is disconnected from the liquid supply.

When the shaft 70, gradually turns beyond the half revolution the port 26, will move away from port 29, to disconnect receptacle 9, from the liquid supply and cam 148, will come to act upon the spindle in valve casing 127. This latter will unseat the valve in this casing and as a consequence the receptacle 9, will be opened with the gas supply through pipes 146, 143, and 141. Gas will now flow into the receptacle 9, to mix with the liquid therein and provide the propelling force for expelling the water. From this last position the shaft 70, will proceed another quarter turn, when the cam 148, will press in the spindle in valve casing 125, and unseat the valve therein. This will open the pipe 140, leading from receptacle 10, and any residual pressure in the latter will blow off through plug 142, in casing 125, and reduce this receptacle to atmospheric pressure. The next change will take place when a partial revolution of shaft 70, brings the liquid ports to register as in Fig. 6, which is the position with which the description of the above operations began. The operations above described will be repeated at each revolution of shaft 70, whether the latter operates continuously or even when considerable time elapses between partial revolutions and in no case will the mixture become affected by the improper release of gas nor will the gas leak into the atmosphere or into the water main. The gas which passes with or behind the liquid when receptacles 9, or 10, are emptying into the reservoir not only supplies the latter with gas to continue aeration, but also to furnish the propelling force for driving the liquid from the reservoir to the dispensing faucets.

As shaft 70, is operated by the manually operated device the reservoir is replenished with liquid in accordance with the amount of liquid withdrawn therefrom because at each operation of one of the coin controlled mechanisms the shaft 70, is advanced one unit of motion. There is no point reached where the replenishing operation ceases to be operative as is the case in the balanced valve system hereinbefore referred to. By employing the complete arrangement as herein shown, a single replenishing mechanism will suffice for the several distributing devices and each of the latter will effect the operation of the former. In practice I arrange 44, teeth on the gear 72, so that each time 22, drinks have been withdrawn from the reservoir one of the primary receptacles will discharge its contents into the reservoir, which will be sufficient to replace the quantity withdrawn for the 22, drinks. It will be understood that a single primary receptacle could be used by simply omitting the other and its connections, but I prefer to use a plurality thereof and operate them in alternate relation because the whole arrangement is then more successful in its construction and operation.

In the event the reservoir is so completely filled at a time when either primary receptacle is connected therewith to discharge its contents into the reservoir, that there is insufficient space to receive any or all of the contents of the primary receptacle at this time, no difficulty will arise in the operation of the machine. In such event, part or all of the contents of the primary receptacle failing to discharge will remain therein, until the same primary receptacle is again connected with the liquid supply, when such receptacle will receive either no fresh supply of liquid or only enough in addition to what is left remaining therein to fill the primary receptacle. From thence on the machine will operate as before without change.

I have produced a machine which is automatic in the sense that the force of the gas is used to propel the liquid or mixture through the machine; that the supply in the reservoir is replenished in accordance with the amount drawn off; and by controlling the replenishing operation by the dispensing mechanism greater results are not only obtained but the mechanism is made simpler and more positive. All parts are accessible and the entire machine may be confined within a cabinet of reasonable proportions. Aside from the above the machine is so constructed that there are no leakages and therefore no deterioration of the mixture, even though the machine remains idle for a considerable time between operations.

Matters herein shown and described, but not claimed, form the subject matter of a divisional application filed by me on the 14 day of May 1912, and serially numbered 697,112.

Having described my invention what I claim is:—

1. In a machine of the class described, liquid dispensing mechanism, a liquid reservoir, a primary receptacle for delivering liquid to the reservoir, a source of liquid supply and a source of gas supply for said primary receptacle, and controlling means operated by said dispensing mechanism, constructed and arranged whereby, when operated by said dispensing mechanism, it will open the source of gas supply to said primary receptacle, open the primary receptacle with the reservoir while the primary receptacle is shut off from the liquid supply, and shut off the primary receptacle from the liquid supply while said primary receptacle is open with the reservoir.

2. In a machine of the class described, liquid dispensing mechanism, a liquid reservoir, a primary receptacle for delivering liquid to the reservoir, a source of liquid supply and a source of gas supply for said primary receptacle, and controlling means operated by said dispensing mechanism, constructed and arranged whereby, when operated by said dispensing mechanism, it will open the source of gas supply to said primary receptacle, open the primary receptacle with the reservoir while the primary receptacle is shut off from the liquid supply, and shut off the primary receptacle from the liquid supply while said primary receptacle is open with the reservoir and while the primary receptacle is open with the gas supply.

3. In a machine of the class described, liquid dispensing mechanism, a liquid reservoir, a primary receptacle for delivering liquid to the reservoir, a source of liquid supply and a source of gas supply for said primary receptacle, and controlling means for opening and closing the primary receptacle with the liquid and gas supplies and with the reservoir, adapted, when operated by said dispensing mechanism, to open the liquid supply with the primary receptacle while the latter is shut off from the gas supply, to open the primary receptacle with the gas supply while the primary receptacle is closed to the liquid supply, and open the primary receptacle with the reservoir when the primary receptacle is closed with the liquid supply.

4. In a machine of the class described, liquid dispensing mechanism, a liquid reservoir, a primary receptacle for delivering liquid to the reservoir, a source of liquid supply and a source of gas supply for said primary receptacle, controlling means operated by said dispensing mechanism, adapted to open and close the primary receptacle with the sources of gas and liquid supply and with the reservoir, and adapted, when operated by said dispensing mechanism, to open the primary receptacle with the gas supply while said primary receptacle is shut off from the liquid supply, to open the primary receptacle with the liquid supply while the primary receptacle is shut off from the gas supply and reservoir, and to open the primary receptacle with the reservoir while the primary receptacle is shut off from the source of liquid supply and open with the gas supply.

5. In a machine of the class described, a liquid reservoir, a primary receptacle for supplying liquid to the reservoir, a source of liquid supply and a source of gas supply for said primary receptacle, means for sniffing the pressure in the reservoir and controlling means for controlling the connections between the primary receptacle and the sources of gas and liquid supply, and between the primary receptacle and reservoir, and the sniffing of the pressure from the primary receptacle, and adapted to operate in the following order; to open the primary receptacle with the liquid supply while the primary receptacle is closed with the reservoir, close the primary receptacle with the liquid supply and open it with the gas supply, open the primary receptacle with the reservoir, close the primary receptacle from the reservoir and gas supply, and sniff the pressure from the primary receptacle.

6. In a machine of the class described, liquid dispensing mechanism, a liquid reservoir, a primary receptacle for supplying liquid to the reservoir, a source of liquid supply and a source of gas supply for said primary receptacle, means for sniffing the pressure in the reservoir and controlling means operated by said dispensing mechanism, for controlling the connections between the primary receptacle and the sources of gas and liquid supply, and between the primary receptacle and reservoir, and the sniffing of the pressure from the primary receptacle, and adapted, when operated by the dispensing mechanism, to operate in the following order; to open the primary receptacle with the liquid supply while the primary receptacle is closed with the reservoir, close the primary receptacle with the liquid supply and open it with the gas supply, open the primary receptacle with the reservoir, close the primary receptacle from the reservoir and gas supply and sniff the pressure form the primary receptacle, and a float valve for opening the primary receptacle, adapted to be closed by liquid or gas in the primary receptacle.

7. In a machine of the class described, means for carbonating liquid, a measuring device, and dispensing mechanism, including valves controlling the supply of liquid to the measuring device, valves controlling the discharge of liquid from the measuring device, and means for unseating the said valves, said first valves being constructed and arranged whereby the pressure from the carbonating means will tend to seat said valves, and said second valves being constructed and arranged whereby the pressure from said measuring device will tend to seat said valves.

8. In a machine of the class described, means for carbonating liquid, a measuring device, and dispensing mechanism, including valves controlling the supply of liquid to the measuring device, valves controlling the discharge of liquid from the measuring device, said first valves being constructed and arranged whereby the pressure from the carbonating means will tend to seat said valves, and said second valves being constructed and arranged whereby the pressure from the measuring device will tend to seat said valves, and means arranged to open said first valves alternately and to open said second valves alternately, and in alternate relation to said first valves.

9. In a machine of the class described, means for carbonating a liquid, a measuring device, valves having operating spindles, said valves being arranged to control the supply of liquid from the carbonating means to the measuring device, and constructed and arranged whereby the pressure from the carbonating means will tend to seat said valves, other valves having operating spindles, and arranged to control the delivery of liquid from the measuring device and arranged whereby the pressure from the measuring device tends to seat said valves, a manually operated shaft, the said first valves being arranged with their spindles directed toward said shaft, cams on said shaft for operating said spindles alternately, and cams on said shaft arranged to operate the spindles of said second valves alternately, and in alternate relation with the operation of the spindles of said first valves.

Signed at the city, county and State of New York, this 4th day of January, 1912.

HENRY PEIN.

Witnesses:
ANNA L. BAUER,
EDWARD D. C. SPERRY.

---

Copies of this patent may be obtained for five cents each, by addressing the "Commissioner of Patents, Washington, D. C."